United States Patent
Kim et al.

[11] Patent Number: 5,998,323
[45] Date of Patent: Dec. 7, 1999

[54] HIGH FREQUENCY DIELECTRIC MATERIAL

[75] Inventors: Hyun Jai Kim; Hyung Jin Jung; Seok Jin Yoon; Ji Won Choi; Kucheiko Sergei, all of Seoul, Rep. of Korea

[73] Assignee: Korea Institute of Science and Technology, Seoul, Rep. of Korea

[21] Appl. No.: 09/080,240

[22] Filed: May 18, 1998

[30] Foreign Application Priority Data

May 27, 1997 [KR] Rep. of Korea ............... 97-21045

[51] Int. Cl.$^6$ .................................... C04B 35/497
[52] U.S. Cl. ............................................. 501/135
[58] Field of Search ........................ 501/134, 135

[56] References Cited

U.S. PATENT DOCUMENTS

| | | | |
|---|---|---|---|
| 5,219,808 | 6/1993 | Kagata et al. | 501/135 |
| 5,459,115 | 10/1995 | Kagata et al. | 501/135 |
| 5,565,391 | 10/1996 | Nakano et al. | 501/135 |

OTHER PUBLICATIONS

S. B. Desu, et al., Journal of the American Ceramic Society, vol. 68, No. 10, pp. 546 to 551, "Microwave Loss Quality of $BaZn_{1/3}Ta_{2/3}O_3$ Ceramics", 1985* No month.

Junichi Kato, et al., Japanese Journal of Applied Physics, vol. 31, Pt. 1, No. 9B, pp. 3144 to 3147, Dielectric Properties Of (PbCa) (MeNb)$O_3$ At Microwave Frequencies, 1992* No month.

Junichi Kato, et al., Japanese Journal of Applied Physics, vol. 30, No. 9B, pp. 2343 to 2346, "Dielectric Properties Of Lead Alkaline–Earth Zirconate At Microwave Frequencies", Sep. 1991.

Shoichiro Nomura, et al., Japanese Journal of Applied Physics, vol. 22, No. 7, pp. 1125 to 1128, Effect of Mn Doping On The Dielectric Properties of $Ba_2Ti_9O_{20}$ Ceramics At Microwave Frequency, Jul. 1983.

Susumu Nishigaki, et al., American Ceramic Society Bulletin, vol. 66, No. 9, pp. 1405 to 1410, "Microwave Dielectric Properties Of (Ba, Sr)O–$Sm_2O_3$–$TiO_2$ Ceramics", 1987 No month.

K. Wakino, et al., Journal of the American Ceramic Society, vol. 67, No. 4, pp. 278 to 281, Microwave Characteristics Of (Zr,Sn)$TiO_4$ And BaO–PbO–$Nd_2O_3$–$TiO_2$ Dielectric Resonators, Apr. 1984.

W. Wersing, High Frequency Ceramic Dielectrics, pp. 67 to 119, "High Frequency Ceramic Dielectrics And Their Application For Microwave Components" No date.

*Primary Examiner*—Karl Group
*Attorney, Agent, or Firm*—Oblon, Spivak, McClelland, Maier & Neustadt, P.C.

[57] ABSTRACT

This invention provides a composition of high frequency dielectric ceramics represented by the following formula:

$$(Pb_{(1-x)}Ca_x)[(Fe_{0.5}Nb_{0.5})_{(1-y)}Sn_y]O_3$$

wherein $0.4 \leq x \leq 0.62$; and $0.05 \leq y \leq 0.1$.

4 Claims, 2 Drawing Sheets

HIGH FREQUENCY DIELECTRIC MATERIAL

BACKGROUND OF THE INVENTION

1. Field of the Invention

The present invention relates to a novel composition of high frequency dielectric ceramics. More particularly, the present invention relates to compositions of high frequency dielectric ceramics having high Q values, high dielectric constants, and stable temperature coefficients of the resonant frequency.

2. Description of the Prior Art

Recently, various communication systems using microwave frequencies with a frequency range of 300 MHz to 300 GHz have been developed. These include mobile radio communication systems such as wireless telephone sets, earphones, satellite broadcasting systems, satellite communication systems and the like. Such systems require high frequency dielectric ceramics applicable to resonators, bandpass (or band-stop) filters, duplexers and microwave integrated circuits (MICs) and the like, and demand for such components have greatly increased. High frequency dielectric ceramics to be applied to such communication systems should have the following characteristics: (1) a high dielectric constant, which is required for miniaturization of parts made of dielectric ceramics because the wavelength of microwaves within dielectric ceramics is inversely proportional to the square root of the dielectric loss; (2) a high Q value corresponding to a reciprocal of the dielectric loss, which is required for high performance because dielectric losse is directly proportional to frequency; and (3) a low temperature coefficient of the resonant frequency of a dielectric resonator. See, W. Wersing, "Electronic Ceramics;, B.C.H. Steele ed., p. 67, Elsevier Sci. Pub. Co., New York (1991). In addition, high frequency dielectric ceramics to be applied to such communication systems should have a small change in properties with time, high thermal conductivity and good mechanical strength.

Examples of dielectric ceramics which have been heretofore developed include a $Ba(M^{+2}_{1/3}, M^{+5}_{2/3})O_3$ system wherein $M^{+2}$ is Mg or Zn, and $M^{+5}$ is Ta or Nb, a $Ba_2Ti_9O_{20}$ system, and a $(Zr,Sn)TiO_4$ system. These types of dielectric ceramics have low dielectric loss, while they have dielectric constant less than about 40. See, W. Wersing, supra, and J. Kato, JEE, Sep., pp. 114–118 (1991).

Other examples include a $BaO$—$Sm_2O_3$—$TiO_2$ system, a $(Ba,Pb)O$—$Nd_2O_3$—$TiO_2$ system, and a $(Pb,Ca)ZrO_3$ system. These types of dielectric ceramics have dielectric constants as high as about 80, while they have relatively high dielectric losse. For Example, the $(Pb,Ca)(Fe,Nb)O_3$ system which currently attracts attention in the art, in its optimal composition, has a dielectric constant of about 91 and $T_f$ of +2.2 ppm/° C., while having low $Q_xF_0$ value of 4,950. See, J. Kato, et al.; Jpn. J. Appl. Phys., Vol. 31, pt. 1, No 9B (1992).

Generally, materials having high dielectric constants exhibit increased dielectric losses and high temperature coefficients of the resonant frequency due to the dipoles and structural defects associated therewith. Furthermore, high dielectric constant materials having high dielectric losses are not suitable for high frequency filters since they lead input signal losses to increase whereby signal transmission is difficult. Therefore, there is a need for a composition which meets the three requirements for high frequency dielectric materials: high dielectric constants, low dielectric losses and stable temperature coefficients of the resonant frequency.

On the other hand, conventional dielectric materials comprising PbO, such as a $BaO$—$PbO$—$Nd_2O_3$—$TiO_2$ system, $(Pb,Ca)ZrO_3$ system, $(Pb,Ca)(Fe,Nb)O_3$ system, are usually sintered above about 1300° C. Due to such high sintering temperatures, when the materials are synthesized or sintered, PbO is volatized and consequently, the chemical equilibrium collapses resulting in irregularity of dielectric properties of the materials produced. Therefore, it is desirable to obtain sintered materials which have consistent dielectric properties after sintering.

SUMMARY OF THE INVENTION

Figure 1:
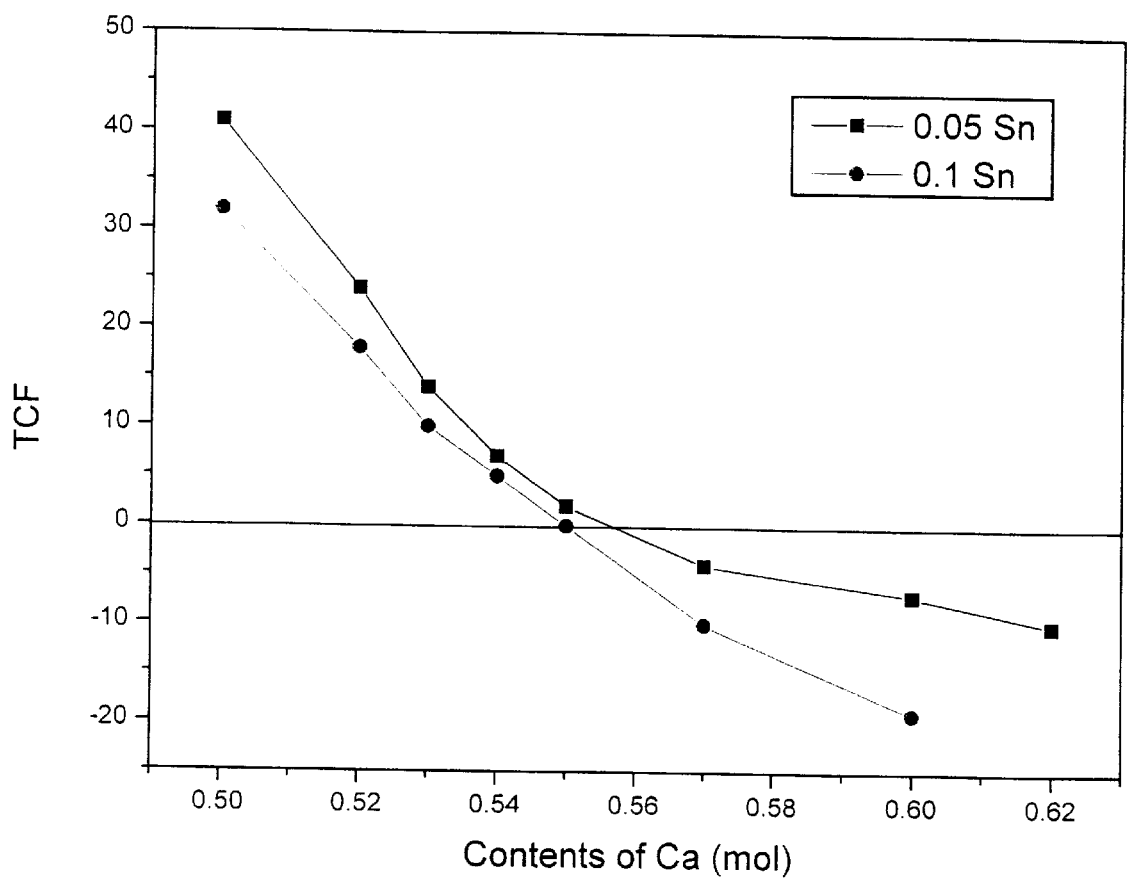
FIG. 1 is a graph showing changes of temperature coefficients of the resonant frequency versus changes of the composition of dielectric ceramics produced by adding atmospheric powder of $PbZrO_3$ according to the present invention.

Therefore, it is an object of the present invention to provide compositions of high frequency dielectric ceramics having high Q values, high dielectric constants, and controllable temperature coefficients of the resonant frequency.

It is another object of the present invention to provide a process of producing the compositions of high frequency dielectric ceramics by solving the problems which occur in sintering conventional compositions of high frequency dielectric ceramics containing PbO.

Further objects and advantages of the invention will become apparent through reading the remainder of the specification.

DETAILED DESCRIPTION OF THE INVENTION

The present invention provides compositions of high frequency dielectric ceramics represented by the following formula:

$$(Pb_{(1-x)}Ca_x)[(Fe_{0.5}Nb_{0.5})_{(1-y)}Sn_y]O_3$$ 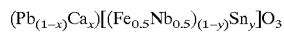

wherein $0.4 \leq x \leq 0.62$; and $0.05 \leq y \leq 0.1$.

The compositions of the invention may be prepared by a process which comprises:
(a) mixing PbO, $CaCO_3$, $Fe_2O_3$, $Nb_2O_5$ and $SnO_2$ in the form of powders previously dried;
(b) calcining the powder mixture obtained in step(a);
(c) milling and then molding the calcined powder into a form;
(d) subjecting the molded form to a heat treatment; and
(e) sintering the heat-treated molded form at a temperature of about 1000 to 1300° C. in the presence of $PbZrO_3$ or an atmospheric powder of the same composition.

In another embodiment, the compositions according to the invention may be prepared by a process which comprises:
(a) mixing PbO, $CaCO_3$, $Fe_2O_3$, $Nb_2O_5$ and $SnO_2$ in the form of powders previously dried;
(b) cacining the powder mixture obtained in step(a);
(c) milling and then molding the calcined powder into a form;
(d) subjecting the molded form to a heat treatment; and
(e) sintering the heat-treated molded form in air at a temperature of about 1000 to about 1300° C.

In both processes for producing the compositions according to the invention, starting materials, PbO, CaCO$_3$, Fe$_2$O$_3$, Nb$_2$O$_5$ and SnO$_2$ are dried for about 10 hours at a temperature of about 600° C. prior to use.

The calcination is carried out for about 2 to 4 hours at a temperature of about 800 to about 1000° C. The calcined and milled powder is formed with an organic binder, such as a 5 wt. % PVA solution. The heat treatment for removing the organic binder is carried out at a temperature of about 600° C. The sintering is proceeded for about 2 to 6 hours. The preferred temperature for sintering is about 1100 to 1200° C.

The compositions of dielectric ceramics according to the present invention have dielectric constants of about 71 to 139, Qxf$_0$(GHz) of about 2,500 to 8,600 and temperature coefficients of the resonant frequency (TCF) of about −19 to +140 ppm/° C. The TCF may be controlled to 0 ppm/° C. by varying the composition of the ceramics. Therefore, the compositions of dielectric ceramics according to the invention can be used to produce components of high frequency dielectric ceramics.

Figure 2:
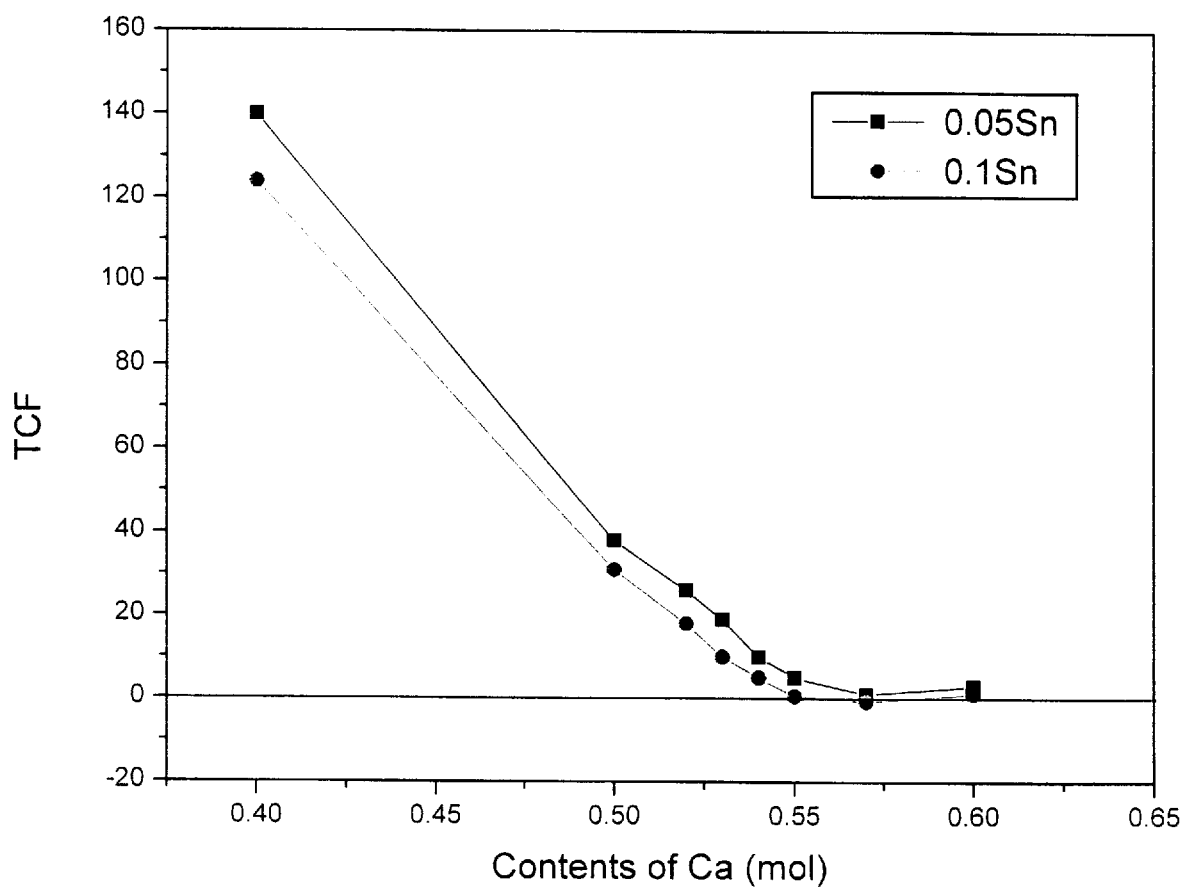
FIG. 2 is a graph showing changes of temperature coefficients of the resonant frequency versus changes of the composition of dielectric ceramics produced without adding atmospheric powders according to the present invention.

The compositions of high frequency dielectric ceramics according to the present invention are certain kinds of perovskite-type solid solutions, which comprise $(Pb_{(1-x)}Ca_x)[(Fe_{0.5}Nb_{0.5})_{(1-y)}Sn_y]O_3$. The properties of the compositions may vary depending on the amounts of Ca and Sn. Increasing the amounts of Ca and Sn contained in the compositions decreases the dielectric constants of the compositions from 139 to 71, while Qxf$_0$(GHz) increases from 2,500 to 8,600. The temperature coefficients of the resonant frequency, when PbZrO$_3$ is used as an atmospheric powder in the sintering, gradually vary from positive (+) to negative values (−) as shown in FIG. 1. On the other hand, when the atmospheric powder is not used in the sintering, the TCF decreases gradually from +140 and form a plateau near 0 as shown in FIG. 2.

The preferred compositions according to the present invention are of formula I wherein $0.53 \leq x \leq 0.62$; and $0.05 \leq y \leq 0.1$.

EXAMPLES

The present invention will be illustrated in greater detail by way of the following examples. The examples are presented for illustrative purposes only and should not be construed as limiting the invention.

Example 1

CaCO$_3$ and Fe$_2$O$_3$, having a purity of 98%, and PbO, Nb$_2$O$_5$ and SnO$_2$, having purity of 99.9%, which were previously dried for about 10 hours at a temperature of 600° C. were weighed in given ratios indicated in Table 1, and then mixed. The powder mixtures were calcined for about 4 hours in air and at a temperature of about 900° C. in air. The resulting calcined powders were milled. The milled powders were pressed into disc-shaped specimens having a diameter of about 10 mm and a thickness of about 5 to 6 mm while adding a 5 wt. % aqueous solution of PVA as an organic binder. The molded specimens were subjected to a heat-treatment for about 1 hour at a temperature of about 600° C. in order to remove the organic binder.

The specimens were sintered for about 3 hours at a temperature of about 1150 to about 1165° C. using PbZrO$_3$ as an atmospheric powder. The specimens shrunk by about 35 to 38% during sintering.

Both sides of the sintered specimens were thoroughly polished up to 3000 times with an abrasive paper and each specimen was introduced into a waveguide.

Dielectric constants, Q values and temperature coefficients of the resonant frequency of the specimens were measured at a frequency range of 5.4 to 6.2 GHz and a temperature range of −15 to 85° C. The dielectric properties of each specimen are shown in Table 1.

TABLE 1

High Frequency Dielectric properties of $(Pb_{(1-x)}Ca_x)[(Fe_{0.5}Nb_{0.5})_{(1-y)}Sn_y]O_3$ system wherein PbZrO$_3$ is used as an atmospheric powder

| Specimen No. | Composition (mole) x | y | Dielectric Constant (εr) | Qxf$_0$ (GHz) | TCF (ppm/° C.) |
|---|---|---|---|---|---|
| Ref.1* | 0.55 | 0 | 91 | 4,950 | +2.2 |
| 1 | 0.5 | 0.05 | 103 | 4,900 | +41 |
| 2 | 0.5 | 0.1 | 100 | 6,650 | +32 |
| 3 | 0.52 | 0.05 | 95 | 5,950 | +24 |
| 4 | 0.52 | 0.1 | 94 | 7,100 | +18 |
| 5 | 0.53 | 0.05 | 92 | 6,000 | +14 |
| 6 | 0.53 | 0.1 | 90 | 7,400 | +10 |
| 7 | 0.53 | 0.05 | 91 | 6,050 | +10 |
| 8 | 0.54 | 0.05 | 89 | 6,100 | +7 |
| 9 | 0.54 | 0.1 | 88 | 7,800 | +5 |
| 10 | 0.55 | 0.05 | 87 | 6,250 | +2 |
| 11 | 0.55 | 0.1 | 87 | 7,900 | 0 |
| 12 | 0.57 | 0.05 | 82 | 5,900 | −4 |
| 13 | 0.57 | 0.1 | 80 | 8,000 | −10 |
| 14 | 0.6 | 0.05 | 78 | 5,560 | −7 |
| 15 | 0.6 | 0.1 | 76 | 8,300 | −19 |
| 16 | 0.62 | 0.05 | 76 | 5,500 | −10 |

*Jpn. J. Appl. Phys., vol. 31, Pt. 1, No. 9B, 3144–3147 (1992)

Example 2

Specimens were prepared following the same procedures as described in Example 1 except that the start materials were mixed in given ratios indicated in Table 2 and the sintering was carried in air without an atmospheric powder. The Dielectric properties of each specimen are shown in Table 2.

TABLE 2

High Frequency Dielectric properties of $(Pb_{(1-x)}Ca_x)[(Fe_{0.5}Nb_{0.5})_{(1-y)}Sn_y]O_3$ system wherein an atmospheric powder is not used

| Specimen No. | Composition (mole) x | y | Dielectric Constant (εr) | Qxf$_0$ (GHz) | TCF (ppm/° C.) |
|---|---|---|---|---|---|
| Ref.1* | 0.55 | 0 | 91 | 4,950 | +2.2 |
| 1 | 0.4 | 0.05 | 137 | 2,500 | +140 |
| 2 | 0.4 | 0.1 | 139 | 2,600 | +124 |
| 3 | 0.5 | 0.05 | 98.3 | 6,300 | +37 |
| 4 | 0.5 | 0.1 | 98 | 6,720 | +31 |
| 5 | 0.52 | 0.05 | 93.8 | 7,020 | +25 |
| 6 | 0.52 | 0.1 | 93 | 7,650 | +18 |
| 7 | 0.53 | 0.05 | 91.5 | 7,200 | +17 |
| 8 | 0.53 | 0.1 | 89 | 8,050 | +10 |
| 9 | 0.54 | 0.05 | 90 | 7,510 | +6 |
| 10 | 0.54 | 0.1 | 88 | 8,425 | +5 |
| 11 | 0.55 | 0.1 | 86.6 | 7,670 | +4 |
| 12 | 0.55 | 0.1 | 86 | 8,600 | +0.5 |
| 13 | 0.57 | 0.05 | 83 | 7,810 | −1 |
| 14 | 0.57 | 0.1 | 75 | 7,800 | −0.7 |
| 15 | 0.6 | 0.05 | 79.2 | 4,750 | +3 |
| 16 | 0.6 | 0.1 | 71 | 6,500 | +1 |

*Jpn. J. Appl. Phys., vol. 31, Pt. 1, No. 9B, 3144–3147 (1992)

What is claimed is:

1. A composition of high frequency dielectric ceramics represented by the following formula:

$$(Pb_{(1-x)}Ca_x)[(Fe_{0.5}Nb_{0.5})_{(1-y)}Sn_y]O_3$$

wherein $0.4 \leq x \leq 0.62$; and $0.05 \leq y \leq 0.1$.

2. The composition of claim 1 wherein $0.53 \leq x \leq 0.62$; and $0.05 \leq y \leq 0.1$.

3. A process for producing the composition of high frequency dielectric ceramics of claim 1 or 2 comprising:

(a) mixing PbO, $CaCO_3$, $Fe_2O_3$, $Nb_2O_5$ and $SnO_2$ in the form of powders previously dried;

(b) calcining the powder mixture obtained in step (a);

(c) milling and then molding the calcined powder into a form;

(d) subjecting the molded form to a heat treatment; and (e) sintering the heat-treated molded form at a temperature of about 1000 to 1300° C. in the presence of $PbZrO_3$ or an atmospheric powder of the same composition.

4. A process for producing the composition of high frequency dielectric ceramics of claim 1 or 2 comprising:

(a) mixing PbO, $CaCO_3$, $Fe_2O_3$, $Nb_2O_5$ and $SnO_2$ in the form of powders previously dried;

(b) calcining the powder mixture obtained in step (a);

(c) milling and then molding the calcined powder into a form;

(d) subjecting the molded form to a heat treatment; and (e) sintering the heat-treated molded form in air at a temperature of about 1000 to 1300° C.

* * * * *

UNITED STATES PATENT AND TRADEMARK OFFICE
CERTIFICATE OF CORRECTION

PATENT NO. : 5,998,323

DATED : December 7, 1999

INVENTOR(S): Hyun Jai KIM, ET AL.

It is certified that an error appears in the above-identified patent and that said Letters Patent is hereby corrected as shown below:

Column 1, line 32 "losse" should read --loss--.

Column 1, line 51 "losse." should read --loss.--.

Column 1, line 54 "$T_f$" should read --$\tau_f$--.

Column 1, line 54 "$Q_xF_o$" should read --$Q \cdot f_o$--.

Signed and Sealed this

Twenty-second Day of May, 2001

Attest:

NICHOLAS P. GODICI

Attesting Officer    Acting Director of the United States Patent and Trademark Office